United States Patent
Novák

(10) Patent No.: US 9,515,911 B2
(45) Date of Patent: Dec. 6, 2016

(54) METHOD AND A PROCESSING DEVICE FOR DISTRIBUTED NETWORK MONITORING

(71) Applicant: TELEFONAKTIEBOLAGET L M ERICSSON (publ), Stockholm (SE)

(72) Inventor: Zoltán Novák, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 14/385,598

(22) PCT Filed: May 28, 2014

(86) PCT No.: PCT/EP2014/061074
§ 371 (c)(1),
(2) Date: Sep. 16, 2014

(87) PCT Pub. No.: WO2015/180768
PCT Pub. Date: Dec. 3, 2015

(65) Prior Publication Data
US 2016/0241455 A1    Aug. 18, 2016

(51) Int. Cl.
*H04L 12/26* (2006.01)
(52) U.S. Cl.
CPC ............... *H04L 43/16* (2013.01); *H04L 43/06* (2013.01)

(58) Field of Classification Search
CPC ................................ H04L 43/16; H04L 43/06
See application file for complete search history.

(56) References Cited

U.S. PATENT DOCUMENTS

| 7,742,424 | B2 | 6/2010 | Cormode et al. |
| 8,307,080 | B2 | 11/2012 | Cormode et al. |
| 2010/0255830 | A1 | 10/2010 | Manolescu et al. |

OTHER PUBLICATIONS

Cormode, Graham, "The Continuous Distributed Monitoring Model", SIGMOD Record, vol. 42, No. 1, Mar. 5-14, 2013.

*Primary Examiner* — Angela Nguyen
(74) *Attorney, Agent, or Firm* — Murphy, Bilak & Homiller, PLLC

(57) ABSTRACT

The invention relates to a method for distributed network monitoring. The network comprises a central processing device and a multitude of N measuring devices. Each measuring devices has received from the central device a granularity value. A granularity value is a measure which defines when a report is transmitted to the central processing device and consequently a measure of detected but not reported data. The granularity values $G_{init\ 1} \ldots G_{init\ N}$ initially assigned to the measuring devices form a monotonic series. The central processing device detects when the largest granularity value has to be changed to ensure that a global value derived from the reports will not exceed a threshold value more than a maximal error.

11 Claims, 6 Drawing Sheets

METHOD AND A PROCESSING DEVICE FOR DISTRIBUTED NETWORK MONITORING

TECHNICAL FIELD

The invention relates to the field of network technologies and, in particular, relates to a method and processing device for distributed network monitoring.

BACKGROUND

Monitoring is an issue of primary concern in current and next-generation network systems. The objective of sensor networks is to monitor their surroundings for a variety of important applications, such as traffic control, atmospheric conditions, and troop movements, among others. Monitoring in data networks is critical not only for accounting and for management, but also for detecting anomalies and attacks. Such monitoring applications are inherently continuous and distributed and usually introduce a significant communication overhead.

Having a number of distributed elements (sensors, computers, router line cards) in a network that are capable of measuring or counting certain local parameters of interest either by regular checking or by some interrupt method, the task is to monitor an aggregated value (average or sum) at a dedicated central element in the network. Especially to notice when the aggregated value crosses some predefined threshold.

In high-end routers, traffic is usually distributed among independent routing components (line cards, forwarding processors), while there is a need to measure or monitor aggregated traffic too. Routers usually use the same resources for monitoring and accounting and for traffic control and management, from which (usually) the latters have higher priority, and resources used for accounting or monitoring—including the current problem of monitoring of traffic aggregates—should be minimalized.

The problem mentioned above is a special case of a broader field called distributed monitoring problems. A survey of recent developments in this general field have been written by Graham Cormode in "The continuous distributed monitoring model," ACM SIGMOD Record, vol. 42, no. 1, pp. 5-14, 2013. In "Communication-Efficient Distributed Monitoring of Thresholded Counts" by R. Keralapura, G. Cormode and J. Ramamirtham, Proceedings of the 2006 ACM SIGMOD international conference on Management of data, pp. 289-300, 2006, the problem of thresholded counts is addressed by setting local thresholds at each monitoring node and initiating communication only when the locally observed data exceeds these local thresholds. Changing the precision of monitoring in the distributed network requires sending at the same time a message to each monitoring node to change the local thresholds. This can cause network performance degradation at the central coordinator node. Furthermore, the monitoring accuracy can only be changed in relative big exponential steps. Therefore the described methods are not able to handle efficiently dynamic global threshold and required error changes during operation.

SUMMARY

It is an object of the invention to provide an improved method and devices for distributed network monitoring systems.

According to a first aspect of the invention, there is provided a method for distributed network monitoring. The network comprises a central processing device and a multitude of N measuring devices. The central processing device assigns an initial granularity value $G_{init}$ to each of the N measuring devices. A granularity value of a measuring device determines when data at said measuring device is sent to the central processing device. The initial granularity values have been selected such that the following equation applies: $GV_{actual} + \Sigma_{i=1}^{N} G_{init\ i} \leq \text{Limit} + \text{Error}_{max}$, where $GV_{actual}$ is a global value calculated from currently received data from the N measuring devices, $G_{init\ i}$ is the initial granularity value of the $i^{th}$ measuring device, Limit is a global threshold value which has to be passed and $\text{Error}_{max}$ is the maximal difference between the global threshold value and a global value calculated from received data at the central processing device and all unreported data at the N measuring devices. The initial granularity values $G_{init\ 1} \ldots G_{init\ N}$ form a monotonic series. The central processing device receives new data from at least one of the N measuring devices and calculates an updated global value UGV from the previously received data and the newly received data. If $UGV + \Sigma_{i=1}^{N} G_i > \text{Limit} + \text{Error}_{max}$ than the central processing device sends a message to the measuring device having the largest granularity value $G_L$. The message instructs the measuring device to use a new granularity value $G_{new}$. The new granularity value complies with the equation $G_{new} \leq G_S$, where $G_s$ corresponds to the granularity value of the measuring device having the smallest granularity value.

The principle of the present invention is that the monitoring accuracy is changed in smaller steps by reducing the granularity value of one or more measuring devices having the highest granularity value such that $UGV + \Sigma_{i=1}^{N} G_i \leq \text{Limit} + \text{Error}_{max}$. The amount of unreported data is kept such that in case all measuring devices send at the same time their data to the central processing device the global value determined with the new data does not exceed the value $\text{Limit} + \text{Error}_{max}$. In this way, it is ensured that when the global value passes the value Limit the difference between the global value and the value Limit is smaller than the value $\text{Error}_{max}$. A reduction of the granularity value at a measuring device decreases the amount of unreported data collected the measuring device and increases the frequency data is reported to the central processing device. In this way the crossing of the value Limit is always signalled within a given precision interval. Furthermore, the actual communication costs are initially low and increases in proportion as the difference between the global value and the value of Limit decreases.

In an embodiment of the method, a measuring device determines a local value $V_{local}$ from measuring data at said measuring device. The measuring data comprises reported measuring data as well as unreported measuring data. The measuring device transmits unreported measuring data to the central processing device if $V_{local} > V_{last} + G_{current}$, where $V_{last}$ is the local value derived from reported measuring data and $G_{current}$ is a granularity value used by the measuring device and updates the value of $V_{last}$ with the local value $V_{local}$. An advantage of the feature is that the frequency of sending reports is linear to the activity measured by the measuring device or the increase of the local value over time.

In an embodiment, $G_{new} = f(G_{large})$. The features enables to send to a measuring device which granularity value has to be changed a short message with only an indication to decrease its granularity value instead of sending the new granularity value. Upon receipt of the indication, the measuring device determines the new granularity value with the function. In an advantageous embodiment, $G_{new}=G_{large}/c$, where c is a positive value. It has been found that if $5<c<10$ the number of reports needed by the central processing device to detect that the global value crosses/passes the threshold value Limit is optimal/minimal.

In an embodiment, the central processing device determines the new granularity value $G_{new}$, and includes the new granularity value $G_{new}$ in the message. This feature increases the flexibility of assigning granularity values to the measuring devices but increases the traffic load to change the granularity at a particular measuring device. Furthermore, the measuring device doesn't have to know the relation between the new granularity value and the old granularity value.

In an alternative embodiment, after receiving the message to change its granularity value, the measuring device calculates the new granularity value $G_{new}$ by using its current granularity value. This feature enables reducing the traffic load in the network to change the granularity values of the measuring devices.

In an embodiment, if $UGV+\Sigma_{i=1}^{N}G_i(c-1)G_S<Limit+Error_{max}$ than the central processing device sends a message to the measuring device having the smallest granularity value $G_S$. The message instructs the measuring device to use a new granularity value $G_{new}$, wherein $G_{new} \geq G_L$, $G_L$ corresponds to the granularity value of the measuring device having the largest granularity value. The measuring device sends new measuring data to the central processing device if $V_{local}<V_{last}-G_{current}$, where $V_{last}$ is the local value at sending the previous measuring data and $G_{current}$ is the last received granularity value by the measuring device. After sending new measuring data, the measuring device updates the value of $V_{last}$, with the current local value $V_{local}$. The feature enables adjusting the frequency of sending reports with new measuring in response to the difference between the actual global value and the threshold value. The frequency decreases if the difference between the actual global value and the threshold value increases.

According to a second aspect, there is provided a processing device comprising a processor, an Input/Output device to connect to the network system, a database and a data storage comprising instructions, which when executed by the processor, cause the processing device to generate a monotonic series of N initial granularity values $G_{init\ 1} \ldots G_{init\ N}$, where $G_{init\ 1}$ is the initial granularity value for the $i^{th}$ measuring device. A granularity value for a measuring device determines when data collected at said measuring device is sent to the processing device. The sum of initial granularities complies with $GV_{actual}+G_{init\ 1}$ Limit+Error$_{max}$, where $GV_{actual}$ is a global value calculated from currently received data from the N measuring devices, Limit is a global threshold value and Error$_{max}$ is the maximal difference between the global threshold value and a global value calculated from received data at the central processing device and unreported data at the N measuring devices. Furthermore, the instructions cause the processing device to send the N initial granularity values to the N measuring devices, to store a link between each granularity value $G_i$ and $i^{th}$ measuring device in a data storage, to receive new data from at least one of the N measuring devices, to store the new data in a data storage comprising reported data, to calculate an updated global value UGV from previously received data and the new data, to transmit if $UGV+\Sigma_{i=1}^{N}G_i>Limit+Error_{max}$ a message to the measuring device having the largest granularity value $G_L$, the message instructing the measuring device to use a new granularity value $G_{new}$, wherein $G_{new} \leq G_S$, $G_S$ corresponds to the granularity value of the measuring device having the smallest granularity value; and to update the granularity value of the measuring device having the largest granularity value with $G_{new}$ in the data storage.

According to a third aspect, there is provided a processing device comprising a processor, an Input/Output device to connect to the network system, a database and a data storage comprising instructions, which when executed by the processor, cause the processing device to receive a message comprising data to set a granularity value $G_{current}$, to determine a local value $V_{local}$ from measuring data, to transmit unreported measuring data to a central processing device if $V_{local}>V_{last}\ G_{current}$, where $V_{last}$ is the local value derived from reported measuring data, and to update the value of $V_{last}$, with the local value $V_{local}$.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

Figure 1:
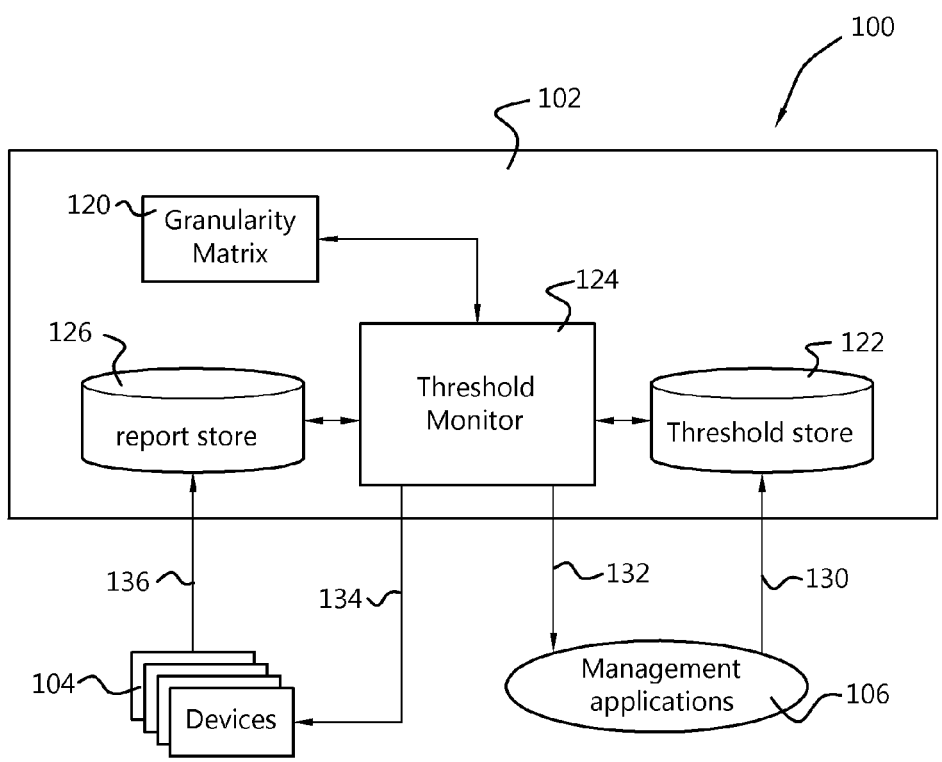
FIG. 1 is a block diagram showing schematically a configuration of network elements for distributed network monitoring.

In FIG. 1 a blocking diagram is shown of the configuration of a distributed-network monitoring system 100. The system comprises a central processing device 102, a multitude of measuring devices 104 and device 106 running management applications. Some not limiting examples of management applications are: road traffic (inrush) control, temperature control, ambient light control in a greenhouse, monitoring animals crossing the border of a domain, troop movements in an area, detection of attacks or anomalies in a data network. Another example of usage is monitoring aggregate (sum or average) of distributed sensor data if sensors have high communication cost (e.g. power consumption in low power devices with wireless connection). The sensor data could be temperature and the aggregate of distributed sensor data, the average temperature over the last 5 minutes. The present application could possibly also be used to build efficient networks of distributed linear combinatory with thresholds: e.g. artificial neurons such as the McCulloch-Pitts neuron model.

The general functioning of a distributed-network monitoring system 100 is as follows. A management applications running on device 106 specifies one or more threshold values. The threshold values are transmitted via data link 130 to the central processing device 102. The central processing device 102, stores the one or more thresholds in a threshold store 122. The measuring devices, which in literature are also called monitoring devices, detect local events or measure/sense local parameters. The measuring devices 104 send the measured data in reports via data link 136 to the central processing device 102 where the reports are stored in a report store 126. The central processing device 102 derives from the data in the report store 126 an aggregated value, which could be an average or sum. When the aggregate value crosses a threshold which is stored in the threshold store 122, the central processing device 102 reports this event via data link 132 to the management application 106.

According to the present application, the central processing device further comprises a granularity matrix 120. In the granularity matrix 120, a granularity value is stored related to each of the measuring devices. In the granularity matrix is stored which measuring device comprises which granularity value. If the difference between aggregate value and threshold value changes, this could result in changing the granularity value at one or more measuring devices. A change is necessary, to ensure that the difference between aggregate value and threshold value is always smaller than a maximal error when the aggregate has crossed the threshold value. Furthermore, this allows decreasing the number of reports/time period when the difference between the aggregate value and threshold value increases when the aggregate has not crossed the threshold value. The criteria that will be used to change the granularity are described here after in further detail. Data link 134, indicates the transmittal of messages comprising information about setting or changing the granularity value at a measuring device.

The threshold store 122, report store 126 and storage needed for the granularity matrix 120 could be any suitable data storage that is available in a processing device, for example RAM, FLASH-memory, Solid State Drive, hard disk drive.

The system 100 implementing the method of distributed network monitoring according to the present application is a network of a central processing device and several measurement devices. Bi-directional (duplex) messaging exists between the measurement devices and the central processing device. The central processing device could also be described as central coordinator component. In an embodiment, the measurement devices measure monotonously increasing local parameters of interest, e.g. counting the cars passing a boarder. In another embodiment, the measurement devices measure local parameters of interest that could both increase and decrease, e.g. temperature or events/s. Depending on the application, the measurement device could send with one message the value of the latest measurement or the change in value of a local parameter since the last report to the coordinator if a given local threshold has been crossed. The local threshold could relate to the local parameter, time or a combination of both. The central processing device can configure and/or change the local threshold of reporting at a measuring device with one message.

The devices could have either only hardware, or combined software and hardware implementation. The physical layer of communication is not restricted to a particular communication protocol. Reliable point to point duplex messaging is assumed between the measuring and the central components The goal of the present application is to recognize (within a predefined error interval) if the sum (or average) of the local parameters of interest cross some predefined global threshold. An additional goal is to achieve this with minimum number of messages between the coordinator and the measuring nodes.

It is assumed that the network latency is low—the amount of the maximal change of the aggregate during the message latency timeframe should be much lower than the required error limit to be kept:

$$\text{Error}_{max} \gg \max \frac{\Delta \text{ Aggregate}}{\text{Message latency}}$$

where $\text{Error}_{max}$ is the maximum allowed difference between the aggregate (=global value obtained by processing the local parameters) and the predefined global threshold when detecting that the aggregate has crossed the predefined global threshold.

The granularity values form at least a monotonic series $G_1 \ldots G_N$, where $G_{init\ 1}$ is the granularity corresponding to measuring device 1. The granularities could also form a geometric series $\{ \ldots, ax^{(i-1)}, ax^i, ax^{(i+1)}, \ldots \}$. These types of series enable us to fine tune the measuring accuracy of the aggregate with one message. Furthermore, the sum of granularities should be kept as large as possible to ensure that the number of reports is as low as possible without the risk that the difference between the global value and threshold value is larger than $\text{Error}_{max}$. A characteristic of the present distributed network monitoring system is that the measuring devices have different granularity values and use thus different criteria defining when a report has to be sent to the central processing device.

The method of assigning and changing the granularity at the measuring devices will be described with reference to FIGS. 2 and 3 which show a flow diagram illustrating actions according to a first embodiment that are carried out on a central processing device and measuring device, respectively.

The first embodiment relates to a distributed network monitoring system to detect in a network with N measuring devices 104 that the total number of events counted by the N measuring devices from a particular moment in time crosses a threshold value. At said particular moment, all counter values are set to zero. A measuring device 104 sends in a report its actual local counter value. The local counter value LV of a measuring device can be seen as a local parameter. The central processing device 102 sums all local counter values (local parameters) stored in its report store 126 to obtain a global counter value $GV_{actual}$. The global counter value can be seen as global parameters of the distributed network monitoring system. If the global counter value crosses a related threshold value stored in the threshold store 122, a message is sent to the management application 106 which needed this information for further processing.

Figure 2:
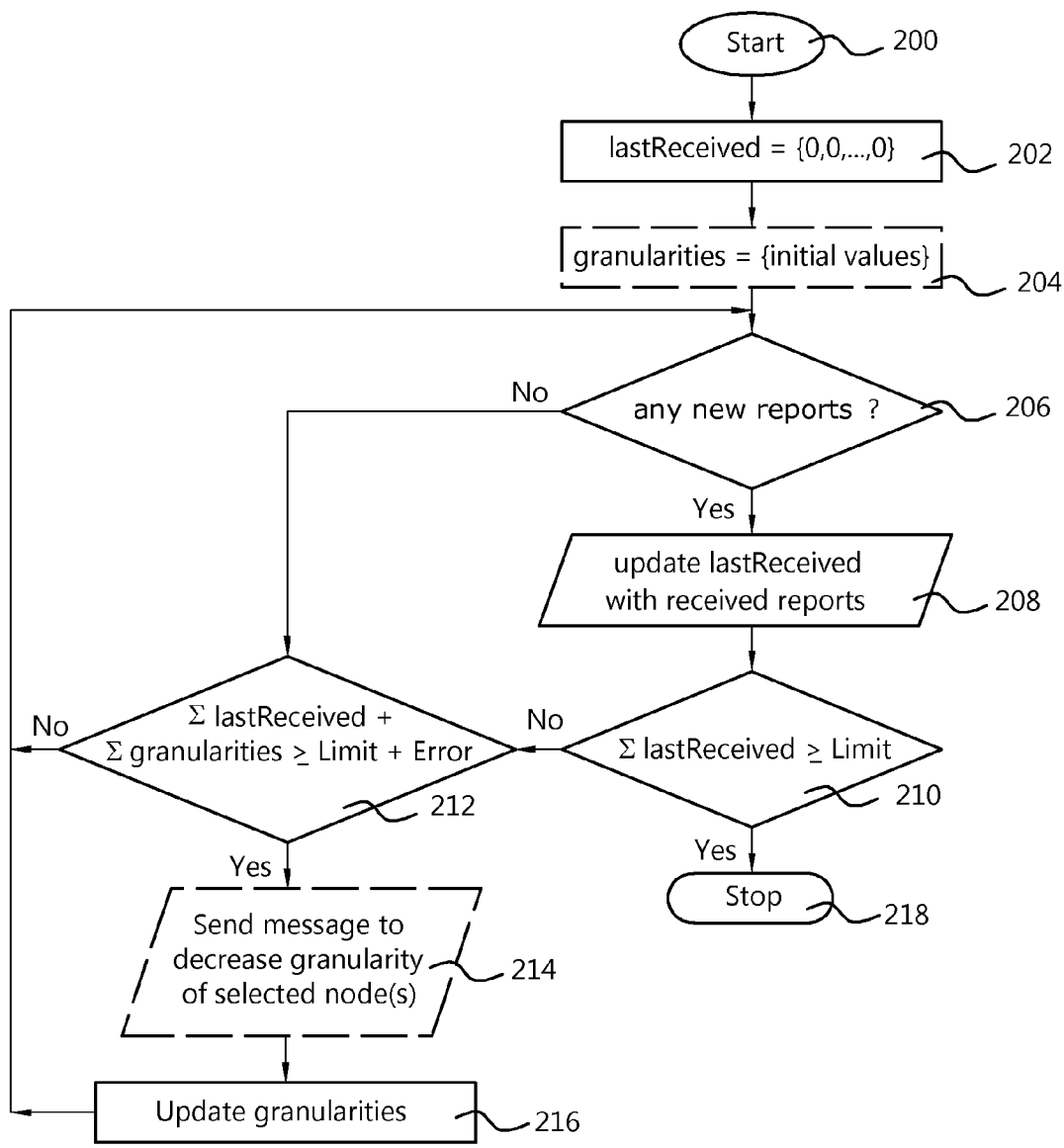
FIG. 2 is a flow diagram illustrating actions according to a first embodiment that are carried out on a central processing device.

FIG. 2 shows in a flow graph the actions performed by the central processing device. After starting the application, indicated with reference numeral 200, the counter values of each measuring device stored in the report store 126 are set to zero. Then in action 204, the central processing device determines an initial granularity value $G_{init\ i}$ for each of the N measuring devices, where $G_{init\ i}$ is the granularity value of the $i^{th}$ measuring device. The initial granularity values are sent to measuring devices and stored in the granularity matrix 120. By means of the granularity matrix, the central processing device 102 knows which measuring device uses which granularity value.

As said before, the granularity value determines at a measuring device 104, when a report comprising the actual counter value should be send to the central processing device 102. In the current embodiment, the granularity value defines that a report is sent by a measuring device when the increase of counter value since the last report is equal or more than the granularity value. This makes clear that in the case all nodes send at the same time a report, the increase of the global counter value GV corresponds to the sum of the granularity values $\Sigma_{i=1}^{N} G_i$. To ensure that the new determined global counter value $GV_{new}$ at detection that the global counter value crosses the global threshold Limit does not exceed more than a value $Error_{max}$ during operation the following equation has to comply with:

$$GV_{actual} + \sum_{i=1}^{N} G_i \leq \text{Limit} + \text{Error}_{max}$$

where $GV_{actual}$ is a global value calculated from currently received data from the N measuring devices, $G_i$ is the granularity value of the $i^{th}$ measuring device, Limit is a global threshold value and $Error_{max}$ is the maximal difference between the global threshold value and a global value calculated from received data at the central processing device and unreported data at the N measuring devices. According to the present application, the granularity values when ordered form a monotonic series. It might be clear, that if initially all counter values of the measuring devices are set to zero, $GV_{actual}=0$. Consequently for the initial granularity values, the following equation has to comply with:

$$\sum_{i=1}^{N} G_{init\ i} \leq \text{Limit} + \text{Error}_{max}$$

where $G_{init\ i}$ is the initial granularity value of the $i^{th}$ measuring device. The initial granularity values $G_{init\ 1} \ldots G_{init\ N}$ form a monotonic series. In an embodiment the values of $G_{init\ 2} \ldots G_{init\ N-1}$ are obtained by linear interpolation between the values of $G_{init\ 1}$ and $G_{init\ N}$. In an alternative embodiment, groups of M initial granularity values have the same value.

Another possible solution of setting initial granularities together with the requirement of building and maintaining geometric series can be given as a function of the number of measuring devices N and a constant c representing the exponential span in the geometric series:

$$G_{init\ i} = \frac{\text{Error}_{max} \cdot \left(c^{\frac{1}{|N|}} - 1\right)}{c - 1} \cdot c^{\frac{i-1+k}{|N|}}$$

$$\text{where: } k = \left\lfloor |N| \cdot \log_c \frac{\text{Error}_{max} + \text{threshold}}{\text{Error}_{max}} \right\rfloor$$

Here it is assumed that the N measuring devices are numbered sequentially from 1 to N. Variable i represents the index number of a given measuring device, and $G_{init\ 1}$ is the initial reporting granularity of node i. parameter c is a tunable constant representing the total span of the geometric series. The geometric series obtained with this formula will be referred to as optimal geometric series. A characteristic of this geometric series is that if the granularity value of measuring nodes with index N is changed to granularity$_N$/c, the new series $G_{init\ N}$, $G_{init\ 1} \ldots G_{init\ N-1}$ forms a similar series as $G_{init\ 1} \ldots G_{init\ N}$ but with values which are multiplied with $G_{init\ 2}/G_{init\ 1}$.

After determining the initial granularity values, storing them in the granularity matrix and sending the granularity values to the respective measuring devices in action 204, the central processing device is waiting for new reports from the measuring devices in action 206. If there is no new report with a local counter, the method proceeds with action 212. If there is a new report from a measuring device, the local counter value LV is stored at the respective location in the report store linked with the index of the measuring device. This update is indicated with 208, where the last received local counter value is updated with a new local counter value from the received report and the method proceeds with action 210. If there is not a new reported counter, the method proceeds with action 212.

In action 210, the central processing device calculates the global counter value with the "last received" local counter values of the measuring devices stored in the report store to obtain an updated global value UGV. Then, in action 210, the sum of all "last received" local counter values is compared with the threshold value Limit. If the sum exceeds the threshold value, a message will be sent to the management application, indicating that the global counter value has crossed the threshold value and the procedure could stop 218. If not, the process continues with action 212.

In action 212, the sum of all "last received" local counter values, i.e. the updated global count value UGV, and the granularity values is compared with summation of the threshold value Limit and the value of $Error_{max}$. This could be represented with the following formula:

$$\Sigma \text{lastreceived} + \Sigma \text{Granulaties} \geq \text{Limit} + \text{Error}_{max}$$

If the formula is "false", it is not possible that if any of the measuring devices sends a report to the central processing unit the updated global count value will be greater than Limit+$Error_{max}$. The sum of the granularity values can be seen as the counted events at the measuring devices which are currently measured but not reported to the central processing device. In this case, the method returns to action 206. However if the formula is "true", it might be possible that if all measuring devices send at the same time a report the new global count value $GV_{new}$ is greater than Limit+$Error_{max}$. This condition has to be avoided. This is done by reducing the granularity value of the measuring device with the largest granularity value $G_{large}$. For the new granularity value $G_{new}$ the following conditions have to be met:

$$G_{new} \leq G_{small}$$

where $G_{smell}$ is the smallest granularity currently used. The following formula could be used to determine the value of $G_{new}$:

$$G_{new} = G_{actual}/c$$

Where $G_{actual}$ is the granularity value of the measuring device having the largest granularity value, a c is a constant which is equal to the exponential span in the geometric series if the initial granularity values have been obtained with the formula of the optimal geometric series. If the initial granularity values have been obtained by interpolation between the values $G_{init\ small}$ and $G_{init\ large}$ than $c=G_{init\ large}/G_{init\ small}$.

In action 214, a message is sent to the measuring device with the largest granularity value to change its granularity value. The message could comprise the new granularity value $G_{new}$. In an alternative embodiment, the message only comprises an indication for the measuring device to decrease its granularity value by dividing its actual granularity value by c. It might be clear that in this case, parameter c has to be known by the measuring device. This could be done by sending the parameter c together with the initial granularity values to the measuring devices in action 204.

After the message is sent in action 214, the central processing device updates in the granularity matrix the entry of the measuring device to which the message is sent to comprise the new granularity value $G_{new}$ in action 216. In this way, the central processing device knows which measuring device uses which granularity value. The granularity matrix enables the central processing device to determine which measuring device has the largest actual granularity value. After action 216 the method proceeds with action 206 to determine whether there is a new reported counter value.

The measuring device which had the largest granularity value before actions 214 and 216 will have the smallest granularity after the actions 214 and 216. In this way the granularity values are still forming a monotonic series.

Changing the granularity at a measuring device requires one message. If the measuring device is capable of division, the granularity change can be solved by sending only one bit.

It should be noted that the actions 214 and 216 could be implemented to determine in one step the measuring devices which granularity has to be decreased such that $\Sigma lastreceived+\Sigma Granulaties<Limit+Error_{max}$ and that the corresponding measuring devices receive a message to change its granularity value. In that case, action 206 could be implemented as a wait instruction till a new report is received from any of the measuring devices.

Figure 3:
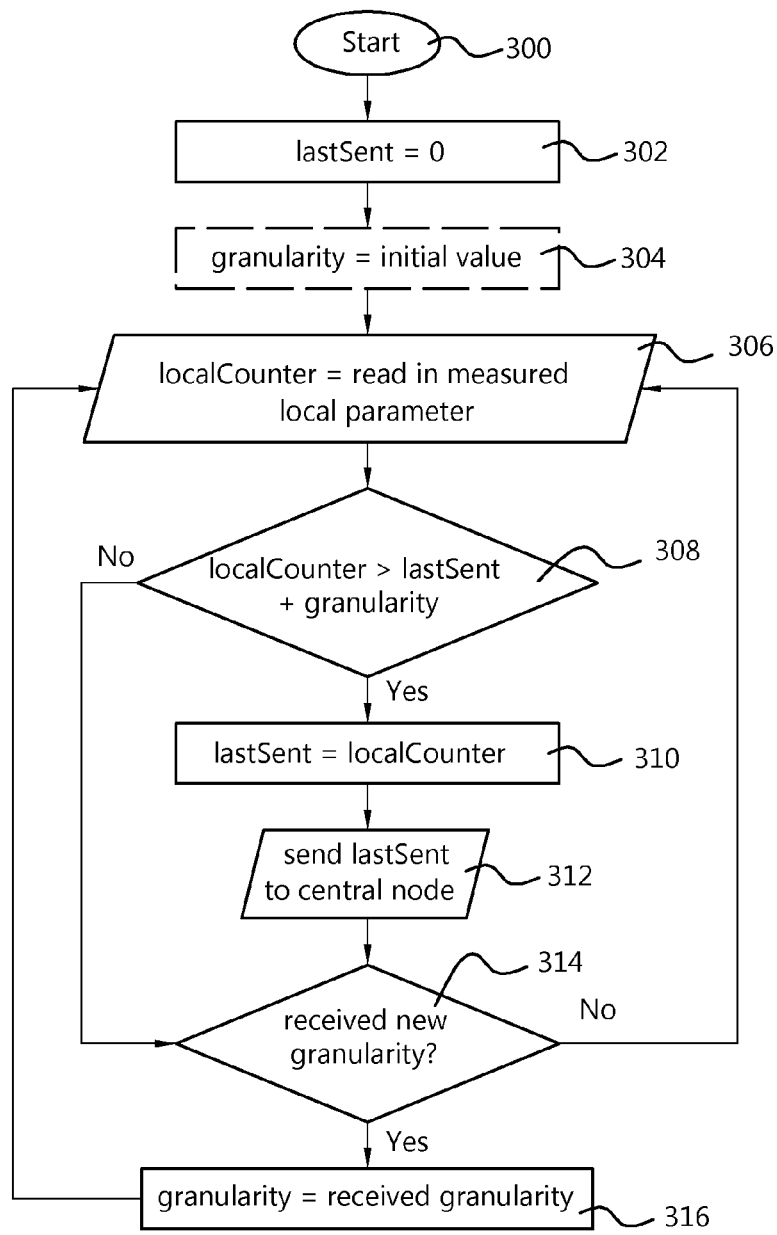
FIG. 3 is a flow diagram illustrating actions according to a first embodiment that are carried out on a measuring device.

FIG. 3 shows the corresponding method performed in a measuring device 104. After starting in action 300, the measuring device resets its parameter lastSent to 0 in action 302. This could be done by receiving a message from the central processing device which comprises an initial granularity value $G_{init}$. Action 306, the actual measured local parameter value $V_{local}$, is assigned to a variable local counter. In the first embodiment $V_{local}$ corresponds to the counted number of events at a measuring device. In action 308, the following inequality is tested:

localcounter>lastSent+granularity where granularity is the actual granularity value of the measuring device. If the inequality is "true", the method proceeds with action 310. If the inequality is "false", the method proceeds with action 314.

In action 310, the value of parameter lastSent is updated with the value of localcounter. Subsequently in action 312 the value of lastSent is sent to the central processing device 102 and the method proceeds with action 314.

In action 314 is tested if a message has been received from the central processing device to change the actual granularity value. If such a message is not received the method returns to action 306. If such a message is received, the measuring device 104 updates its granularity according to the information in the message in action 316. If the granularity value is in the message, the actual granularity value is replaced by the received granularity value. If the message comprises only an indication to change the actual granularity value by dividing the actual granularity value by factor c, the measuring device calculates the new actual value internally. After changing the actual granularity value, the method returns to action 306.

From action 308 is clear that:

localCounter−lastSent≤granularity thus the granularity value is a measure of the number of events that are not reported to the central processing device.

It might be clear from the description of the first embodiment, that due to the report with a local counter from a first measuring device the inequality:

$\Sigma lastreceived+\Sigma Granulaties\geq Limit+Error_{max}$ becomes true and that subsequently the granularity value of a second measuring device is decreased. Due to change of the granularity value at the second measuring device, the inequality at the measuring device:

localcounter>lastSent+granularity could become true resulting in sending the value of localCounter to the central processing device. When the global value approaches the value of Limit the following is true: $\Sigma Granulaties\sim Error_{max}$.

In the first embodiment it was assumed that the localcounter could only increase, in case the value of localcounter could decrease, for example local counter represents temperature, the method in the central processing device could further comprise the test $UGV+\Sigma_{i=1}^{N}G_i(c-1)G_S<Limit+Error_{max}$, where UGV is the Updated Global Value, for example the average temperature and $G_S$ is the smallest granularity currently used. If this test is true, the central processing device sends a message to the measuring device instructing the measuring device to use a new granularity value $G_{new}$, wherein $G_{new}\geq G_L$, $G_L$ corresponds to the granularity value of the measuring device currently having the largest granularity value. Action 308 should in this case be adapted to include further the test: $V_{local}<V_{last}-G_{current}$, wherein $V_{last}$ is the local value at sending the previous measuring data (lastSent) and $G_{current}$ is the last received granularity value by the measuring device. This adaptation allows to reduce the number of reports when the difference between UGV and Limit increases.

Figure 4:
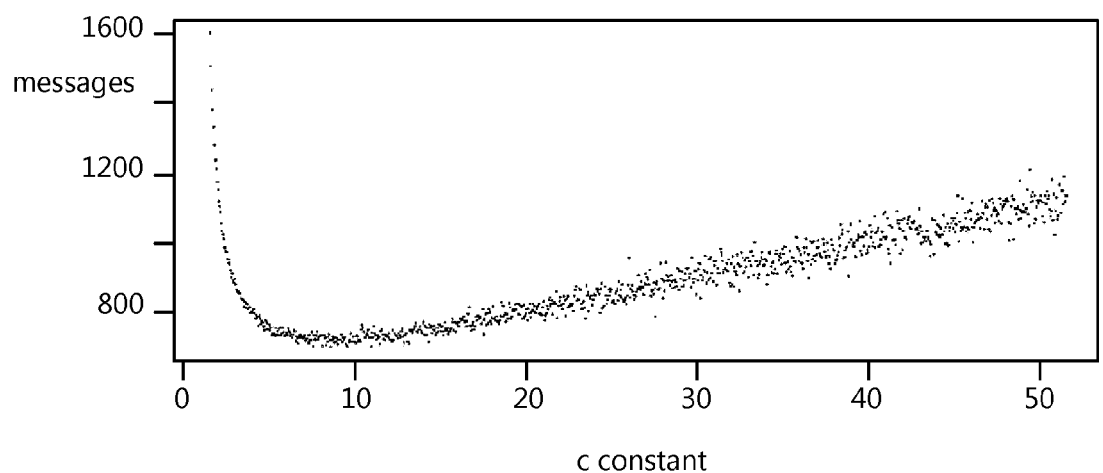
FIG. 4 shows a graph with simulation results.

According to simulations as shown in FIG. 4, c should be chosen between 5 and 15 for optimal performance. In this range the average performance is nearly identical, however smaller c values could result in better worst-case performance. Each point represents an independent run of a simulated setup, with the following parameters: number of measuring devices: N=100, $Error_{max}$=limit/N. The horizontal axis represents the different values of parameter c and the vertical axis represents the total number of messages that has been required in that particular run where the global value GV cross the threshold value limit.

The average message number of the first embodiment (using optimal c constants) is approximately:

Message number≈1.04·|measuring nodes|·log_2 threshold/Error_max

This result has a constant factor, close to two, improvement over the method presented in "Communication-Efficient Distributed Monitoring of Thresholded Counts" by R. Keralapura, G. Cormode and J. Ramamirtham, Proceedings of the 2006 ACM SIGMOD international conference on Management of data, pp. 289-300, 2006.

Figure 6:
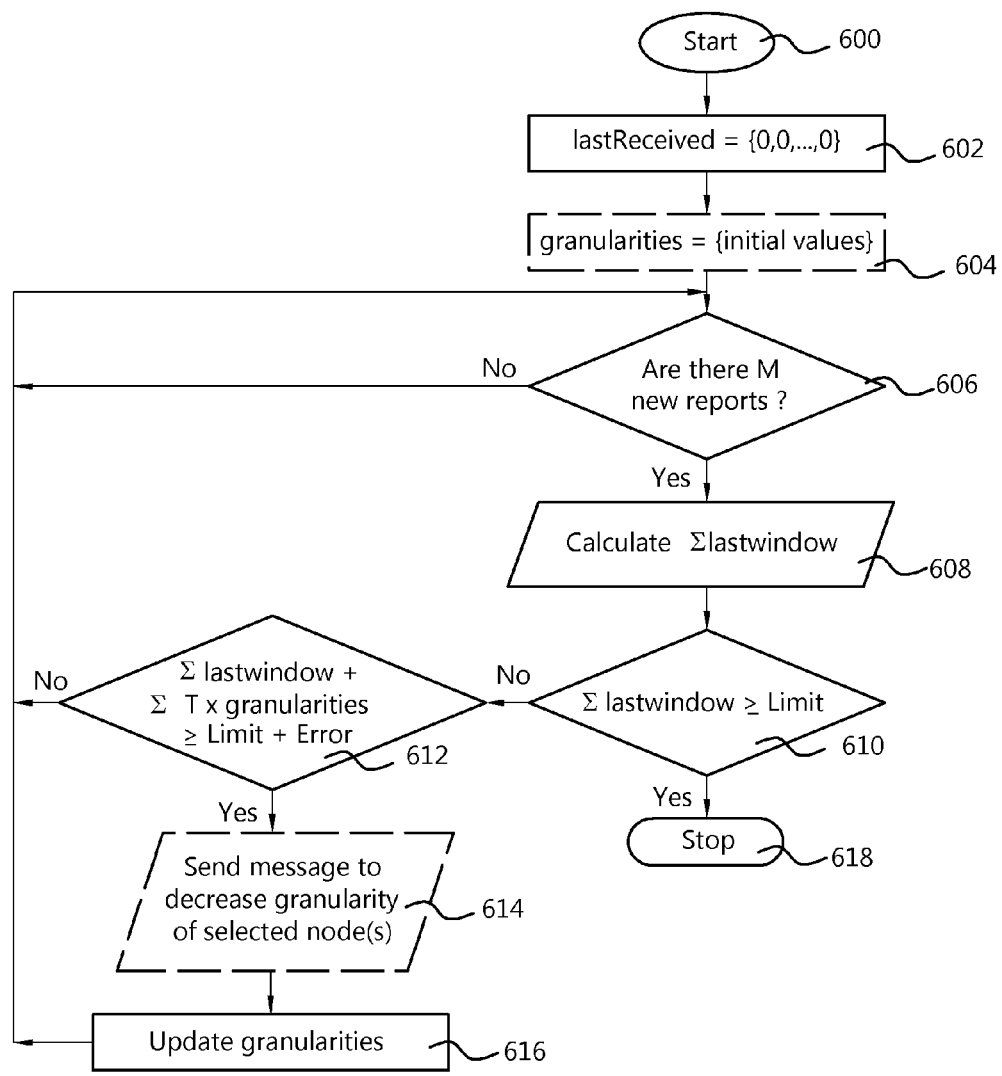
FIG. 6 is a flow diagram illustrating actions according to a second embodiment that are carried out on a central processing device; and, FIG. 7 is a flow diagram illustrating actions according to a second embodiment that are carried out on a measuring device.
Figure 7:
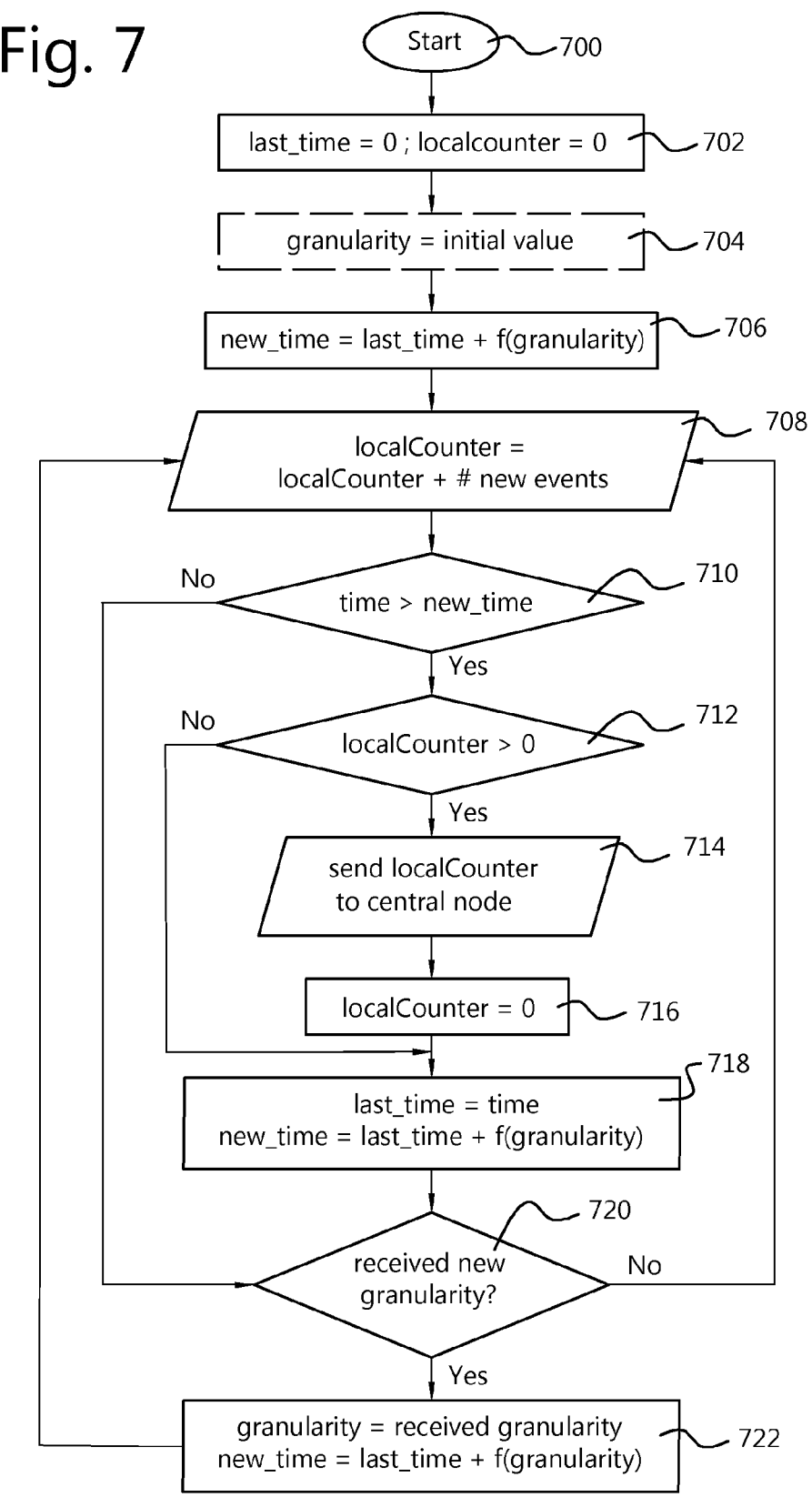

FIGS. 6 and 7 show a flow diagram illustrating actions according to a second embodiment of a method for distributed network monitoring.

The second embodiment relates to a distributed network monitoring system to detect the flow of objects (events/s) in a network with a multitude of N measuring devices 104 and to give an alert when the measured global flow in the network exceeds a predetermined threshold (event/s). The method ensures that at detection the measured global flow does not exceed the predetermined threshold threshold (event/s) plus a max error value $error_{max}$ (event/s). Each measuring device reports at a regular interval $t_i$ the number of events in the period $t_i$, where $t_i$ is the interval of the measuring device having index i. Furthermore, for each node a maximum flow ($maxspeed_i$) of object along the measuring node is defined, where i identifies the index number of the related node. The central processing device 102 stores the receive reports in the report store and sums the number of events over the last T seconds to calculate the actual flow of objects in the network. Thus the following equation has to comply with at detection that the flow value crosses the value threshold:

$$\frac{\sum_0^T events}{T} \le threshold + error_{max}$$

where $\sum_0^T events$=the number of events in time window T, $$\frac{\sum_0^T events}{T} = \text{average number of events in time window } T \text{ per second.}$$

To ensure that during operation the following equation has to comply with:

$$\frac{\sum_0^T events}{T} + \sum_{i=1}^N granularity_i \le threshold + error_{max}$$

This equation can be rewritten as:

$$\sum_0^T events + \sum_{i=1}^N T \times granularity_i \le limit + error$$

where limit=T×threshold which corresponds to the number of events in the last T seconds and error=T×$error_{max}$ which corresponds to the maximum number of events the value limit may be exceeded. In this way, the problem of measuring flow is changed in the problem of counting events over the last T seconds.

The granularity value assigned to each measuring node has a relation with the number of detected events at a moment in time which are not reported to the central processing device. By taking into account the $maxspeed_i$ at measuring node i, it is possible convert the granularity value (number of events/s) assigned to measuring node i to a time interval $t_i$ for said measuring node for sending reports to the central processing device by means of the formula:

$$t_i = granularity_i \times T / maxspeed_i$$

The initial granularity values could be obtained in a similar way as in the first embodiment. It might be clear that if maxspeed is not the same for all measuring devices, the values $t_1 \ldots t_n$ does not form a monotonic series.

FIG. 6 shows in a flow graph the actions performed by the central processing device to perform the method according to the second embodiment. After starting the application, indicated with reference numeral 600, the values of the last received reports stored in the report store 126 are set to zero in action 602. It might also be possible to delete all the reports in the report store. Then in action 604, the central processing device determines an initial granularity value $G_{init\,i}$ for each of the N measuring devices, where $G_{init\,i}$ is the granularity value of the $i^{th}$ measuring device. Furthermore, for each measuring node the corresponding reporting interval $t_i$ has to be calculated by means of the equation above. Depending on the implementation, the reporting interval $t_i$ is determined at the central processing device or the measuring device. In the first case, the central processing device has to know the maxspeed of each measuring device and has to send the value of the reporting interval to the measuring device. In the latter case, the initial granularity values are sent to measuring devices. The granularity values and stored in the granularity matrix 120. By means of the granularity matrix, the central processing device 102 knows which measuring device uses which granularity value and depending on the implementation, the maxspeed in reporting interval of each measuring device.

In the second embodiment, if a report received by the central processing device does not have a time stamp, the central processing device assigns a time stamp to the report. The time stamp indicates the receipt of the report at the central processing device. The time stamp enables the central processing device to calculate the sum of all events reported in the reports of the last time period of T seconds. The last time period can be seen as a window moving in time. In the second embodiment the granularity value defines for each device the maximum number of events that could be reported in a report.

By means of action 606, the central processing device waits each time for M new reports before calculating, in action 608, a new value for Σlastwindow, which corresponds to the number of events in the last time window T. M is a natural number smaller than N, where N is the number of measuring devices reporting to the central processing device. In action 610, Σlastwindow is compared with the threshold value Limit. If the sum exceeds Limit, a message will be sent to the management application, indicating that the flow averaged of the last T seconds has crossed the threshold value and the procedure could stop in action 618. If not, the process continues with action 612.

In action 612, the following equation is evaluated:

Σlastwindow+ΣT×granulaties≥Limit+Error

If the formula is "false", it is not possible that after receiving M reports Σlastwindow will be greater than Limit+Error, where M<N. The sum of the granularity values multiplied with T can be seen as the counted events at the measuring devices which are currently measured but not reported to the central processing device. If "false", the method returns to action 606. However if the equation is "true", it might be possible that if the same granularity values are still used, that after receiving M reports Σlastwindow becomes greater than Limit+Error. This condition has to be avoided. This is done by reducing the granularity value of the measuring device having the largest granularity value $G_{large}$. For the new granularity value $G_{new}$ the following condition has to be met:

$$G_{new} \leq G_{small}$$

where $G_{small}$ is the smallest granularity currently used. The following formula could be used to determine the value of $G_{new}$:

$$G_{new} = G_{actual}/c$$

Where $G_{actual}$ is the granularity value of the measuring device having the largest granularity value, a c is a constant which is equal to the exponential span in the geometric series if the initial granularity values have been obtained with the formula of the optimal geometric series. If the initial granularity values have been obtained by interpolation between the values $G_{init\ small}$ and $G_{init\ large}$ than $c=G_{init\ large}/G_{init\ small}$.

In action 614, a message is sent to the measuring device with the largest granularity value to change its granularity value. The message could comprise the new granularity value $G_{new}$. In an alternative embodiment, the message only comprises an indication for the measuring device to decrease its granularity value by dividing its actual granularity value by c. In the second embodiment, a change of the granularity value corresponds to a change in the reporting interval by dividing the reporting interval by parameter c. It might be clear that in this case, parameter c has to be known by the measuring device. This could be done by sending the parameter c together with the initial granularity values to the measuring devices in action 604.

After the message is sent in action 614, the central processing device updates in the granularity matrix the entry of the measuring device to which the message is sent to comprise the new granularity value $G_{new}$ in action 616. In this way, the central processing device knows which measuring device uses which granularity value and the corresponding reporting interval. The granularity matrix enables the central processing device to determine which measuring device has the largest actual granularity value. After action 616 the method proceeds with action 606 to determine whether there is a new reported counter value.

The measuring device which had the largest granularity value before actions 614 and 616 will have the smallest granularity after the actions 614 and 616. In this way the granularity values are still forming a monotonic series.

FIG. 7 shows the corresponding method performed in a measuring device 104. After starting in action 700, the measuring device resets its parameters last_time and local counter to 0 in action 702. Last_time is a parameter used to determine in combination with the granularity value to moment in time that has to be passed to send a report to the central processing device. The value of Localcounter corresponds to the number of events that has been detected but not reported to the central processing device. The resetting could be done in response to receiving a message from the central processing device which comprises an initial granularity value $G_{init}$. Action 704 represents the receipt of the message from the central processing device comprising the granularity value or the reporting time interval. Action 706, the time moment (new_time) for sending the following report to the central processing device is calculated by adding the time interval corresponding to the granularity value to the value of last_time. In action 708, the value of localcounter is increased with the number of new detected events.

Subsequently in action 710, is tested if the actual time has passed the time moment defined by new_time. If not, the method proceeds with action 720. If passed, the measuring device proceeds with actions 712. In action 712, it is tested if in the last time period related to the granularity value at least one event is detected. This action is optionally but very useful to reduce the amount of reports. A report indicating that no event has been counted in the last time period does not have any effect when counting the total number of events over the last T seconds at the central processing device. If no event has been detected/counted, the method proceeds with action 718. If at least one event is detected, the method proceeds with action 714.

In action 714, a report is sent to the central processing device comprising the value of localcounter. In action 716, localcounter is subsequently set to "zero". In action 718, the time of sending the report is assigned to parameter last_time and the new moment in time that has to be passed for sending a next report is calculated by adding the time period related to the granularity value and the value of last_time. Then the method proceeds with action 720.

In action 720 is tested if a message has been received from the central processing device to change the actual granularity value. If such a message is not received the method returns to action 708. If such a message is received, the measuring device 104 updates it granularity according to the information in the message. This action is indicated by 722. If the granularity value is in the message, the actual granularity value is replaced by the received granularity value and a new corresponding time reporting interval is calculated and a value for new_time. If the message comprises only an indication to change the actual granularity value by dividing/multiplying the actual granularity value by factor c, the measuring device calculates the new granularity value and corresponding reporting time interval internally. After changing the actual granularity value, the method returns to action 708.

The flow diagram in FIG. 6 only shows the condition in block 612 when the granularity has to be decreased. It is normal that a flow could change both up and down. By adding the condition:

$$\sum_0^T events + \sum_{i=1}^N T \times granularity_i < limit + error - (c-1)T \times granularity_{small}$$

wherein $granularity_{small}$ is the smallest granularity value, it is possible to increase the reporting interval and decrease the number of reports per time period in case the difference between actual flow and threshold increases.

It should further be noted that actions 712, 714 and 716 could be implemented in other ways. Instead of resetting, the localCounter in action 716, the value of localCounter is assigned to a parameter lastSent. In action 712 is then evaluated if localCounter−lastSent>0, and in action 714 the value of localCounter−lastSent is sent to the central processing device.

Figure 5:
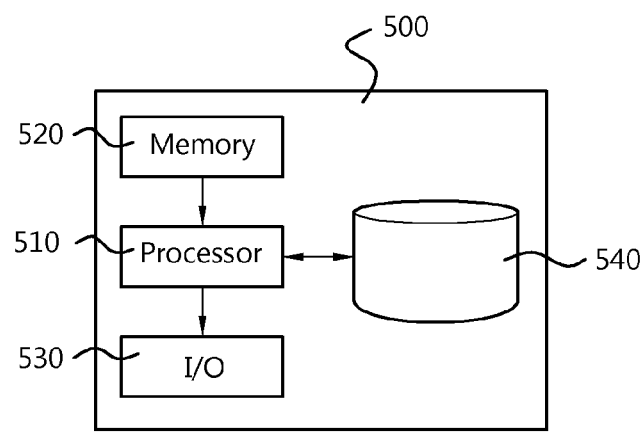
FIG. 5 is a block diagram illustrating a processing device.

Referring to FIG. 5, there is illustrated a block diagram of exemplary components of a processing unit 500 suitable to perform the function of measuring device 104 or central processing device 102 shown in FIG. 1. As illustrated in FIG. 5, the processing unit 500 comprises a processor 510, instruction storage 520, an Input/Output unit 530 and a data storage 540. The instruction storage 520, which could be any suitable memory to store data, comprises instructions that, when executed by the processor 510 cause the processing unit 500 to perform the actions corresponding to any of the methods described in the present application. The I/O unit 530 is configured to support all communications over the data links between devices. In case the processing unit is the central processing device 102, the received reports, the granularity matrix and the threshold values are stored in the data storage 540.

The present invention and its exemplary embodiment can be realized in many ways. For example, one embodiment includes a computer-readable medium or a computer program product having computer readable code stored thereon that are executable by a processor of a piece of equipment inside a node of a private network, such as a processor board, to perform the method of the exemplary embodiments as previously described.

The second embodiment could be used for road traffic inrush control. Several highways and roads lead towards a major city. Some traffic needs to enter the city and some is passing by. On the highways there is a possibility to lower the speed of traffic by means of maximum speed allowed settings on the portals over the highways. This would be required to reduce the traffic pressure on the roads in and around the city to avoid total traffic jam in the city area. Statistically a first threshold has been determined for the inflow of vehicles per hour. If this threshold is passed the road management system takes actions (or proposes actions and a person agrees and executes). A second threshold is applied and when the traffic inflow is less than that, the alarm state is reset and the measures are stopped.

In another application, on the roads/highways towards the city sensors count traffic and report that. As to limit the amount of reports (each report bears cost for using the 4G network), the central system can control the granularity of reporting based on local traffic count. During night time this will mean very few reports and during rush hours quite many. Also highways will have a different reporting interval than roads due to their capacity for vehicles to pass.

In another application of the second embodiment, the flow of fluid in a fluid system is monitored. In this application, the flow of object (events/s) is replaced by flow of fluid ($m^3/s$) and the measuring devices measures volume of fluid ($m^3$).

The current method reduces the total cost involved in reporting without jeopardizing the control mechanism as such. Two threshold could be applied, providing a hysteresis which avoids an alarm set/reset frequently (prevent oscillation of the system).

Another other application of the present method is ambient control in greenhouses. A large greenhouse is equipped with a network of light sensors (WIFI network). The sensors report the amount of light received. The sensors are battery driven and the reporting should be kept as low as possible to provide a long time before replacing them.

The plants in the green house require a certain minimum amount of light to maintain a wanted growth pattern (the amount of required light is variable during the day as the plants have a growth and rest cycle). This minimum light requirement is based on an accumulated amount of light curve as function of the time of day. In fact this is a floating threshold during the day. If accumulated light is below this curve at any point during the day, additional light is produced by lamps in the green house. There is however a cost involved in using the lamps and they should only be used when needed. When lamps are on the ambient light+lights of lamps is counted by the light sensors.

As said battery life needs to be prolonged. The transmission of a report is the main power consummation of the sensor. Therefore the granularity of reporting measured accumulated light is controlled. If the average of reported amount of light is far above the current threshold the granularity can be high, resulting in relative long times between subsequent reports send by a sensor. When approaching the threshold the granularity is set lower. If passed the lamps are switched on and accumulated light of ambient and lamps is measured. A new threshold is set to determine as quickly as possible the moment lamps can be off again. As the amount of light that can be provided by lamps is far less than normal daylight the distance below the current threshold can grow further. In the case the granularity can be set coarser until the measured curve comes close to the minimum curve again. When the accumulated light value raises more above the current threshold the granularity is set higher again and fewer reports are provided. Here one threshold can be passed from both sides. The threshold itself changes during the day. One might also include a potential future increase/decrease of such a variable threshold in the calculation of the threshold.

An advantage of the present method is that each time the granularity of one measuring device is changed to ensure that the global parameter derived from the reports at the central processing device does not pass a threshold value more than a predefined error and to ensure that at least as possible reports have to be transmitted.

The present application provides a monitoring solution in the general sense which continuously tracks the aggregate traffic value with a given precision, or with precision dynamically changing over time. Built on this generic continuous tracking, a solution is provided to change the monitoring precision dynamically in an optimal way to recognize if some predefined limits or thresholds had been passed or crossed. The present solution has the following properties: 1) supports multiple thresholds, 2) can handle the crossing of thresholds in both directions, 3) the precision of threshold monitoring can be set adaptively, 4) is deterministic—the crossings of thresholds are always signalled within the given precision interval, 5) the communication cost (message number and length) is minimized between the distributed measuring nodes and the central location, 6) avoids message bursts by sending only one message at a time.

The more balanced handling of the monitoring accuracy also results in a constant factor improvement in the average required message number compared to Cormode's invention. The present solution is more suitable to implement bi-directional threshold crossings monitoring, as there is no critical point during the operation when a large number of messages would be needed to resend.

In the description of the method above, when the global parameter determined at the central processing device is close to the threshold, the granularity value could become so small that the time between two successive reports is so small that the no events or change in local parameter value/counter could be reported. The method could easily be adapted to have a minimal granularity value to be used by a measuring node. In that case, the central processing device has to keep record of a "fictive" granularity based upon the initial granularity divided by one or more times the constant c and the "real" granularity used by the measuring device. To determine the value for ΣGranulaties the "real" granularity values have to be used. To determine the new granularity value, the "fictive" granularity value is used. If the new "fictive" granularity is smaller than the minimal granularity value, than the minimal granularity value is send to the measuring node. If the new "fictive" granularity is larger than the minimal granularity value, the value of the new "fictive" granularity value is sent to the measuring device. This mechanism makes it possible to return to the original monotonic series in case the difference between global value and threshold increases.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A method for distributed network monitoring, the network comprising a central processing device and N measuring devices, the method comprising:

assigning, by a central processing device, an initial granularity value $G_{init}$ to each of the N measuring devices, a granularity value of a measuring device determining when data at said measuring device is sent to the central processing device, $GV_{actual} + \Sum_{i=1}^{N} G_{init\ i} \leq Limit + Error_{max}$, where $GV_{actual}$ is a global value calculated from currently received data from the N measuring devices, $G_{init\ i}$ is the initial granularity value of the $i^{th}$ measuring device, Limit is a global threshold value and $Error_{max}$ is the maximal difference between the global threshold value and a global value calculated from received data at the central processing device and unreported data at the N measuring devices, the initial granularity values $G_{init\ 1} \ldots G_{init\ N}$ form a monotonic series;

receiving new data from at least one of the N measuring devices;

calculating at the central processing device an updated global value UGV from the received data and the new data;

if $UGV + \Sum_{i=1}^{N} G_i \geq Limit + Error_{max}$ then sending, by the central processing device, a message to the measuring device having the largest granularity value $G_L$, the message instructing the measuring device to use a new granularity value $G_{new}$, wherein $G_{new} \leq G_S$, $G_S$ corresponds to the granularity value of the measuring device having the smallest granularity value.

2. The method of claim 1, wherein the method further comprises:

determining at a measuring device a local value $V_{local}$ from measuring data at said measuring device;

transmitting, by the measuring device, unreported measuring data to the central processing device if $V_{local} > V_{last} + G_{current}$, where $V_{last}$ is the local value derived from reported measuring data and $G_{current}$ is a granularity value used by the measuring device; and, updating the value of $V_{last}$ with the local value $V_{local}$.

3. The method of claim 1, wherein $G_{new} = f(G_{large})$.

4. The method of claim 1, wherein the central processing device determines the new granularity value $G_{new}$, and includes the new granularity value $G_{new}$ in the message.

5. The method of claim 1, wherein after receiving the message the measuring device calculates the new granularity value $G_{new}$ by using its current granularity value.

6. The method of claim 1, wherein if $UGV + \Sum_{i=1}^{N} G_i + (c-1)G_S < Limit + Error_{max}$ than sending, by the central processing device, a message to the measuring device having the smallest granularity value $G_S$, the message instructing the measuring device to use a new granularity value $G_{new}$, wherein $G_{new} \geq G_L$, $G_L$ corresponds to the granularity value of the measuring device having the largest granularity value;

sending, by the measuring device, new measuring data to the central processing device if $V_{local} < V_{last} - G_{current}$, wherein $V_{last}$ is the local value at sending the previous measuring data and $G_{current}$ is the last received granularity value by the measuring device; and, updating, by the measuring device, the value of $V_{last}$ with the current local value $V_{local}$.

7. The method of claim 3, wherein $G_{new} = G_{large}/c$, wherein c is a positive value.

8. The method of claim 7, wherein $5 < c < 10$.

9. A processing device comprising a processor, an Input/Output device to connect to a network, data storages and an instruction storage comprising instructions that, when executed by the processor, cause the processing device to:

generate a monotonic series of N initial granularity values $G_{init\ 1} \ldots G_{init\ N}$, $G_{init\ i}$ is the initial granularity value for the $i^{th}$ measuring device, a granularity value for a measuring device determines when data collected at said measuring device is sent to the processing device, the sum of initial granularities complies with $GV_{actual} + \Sum_{i=1}^{N} G_{init\ i} \leq Limit + Error_{max}$, wherein $GV_{actual}$ is a global value calculated from currently received data from the N measuring devices, Limit is a global threshold value and $Error_{max}$ is the maximal difference between the global threshold value and a global value calculated from received data at the central processing device and unreported data at the N measuring devices;

send the N initial granularity values to the N measuring devices;

store a link between each granularity value $G_i$ and $i^{th}$ measuring device in a data storage;

receive new data from at least one of the N measuring devices;

store the new data in a data storage comprising reported data;

calculate an updated global value UGV from previously received data and the new data;

transmit, if $UGV + \Sum_{i=1}^{N} G_i \geq Limit + Error_{max}$, a message to the measuring device having the largest granularity value $G_L$, the message instructing the measuring device to use a new granularity value $G_{new}$, wherein $G_{new} \leq G_S$, $G_S$ corresponds to the granularity value of the measuring device having the smallest granularity value; and, update the granularity value of the measuring device having the largest granularity value with $G_{new}$ in the data storage.

10. The processing device of claim 9, wherein the instruction storage further comprises instructions, which when executed by the processor, cause the processing device to:

transmit, if $UGV + \Sum_{i=1}^{N} G_i + (c-1)G_S < Limit + Error_{max}$, a message to the measuring device having the smallest granularity value $G_S$, the message instructing the measuring device to use a new granularity value $G_{new}$, wherein $G_{new} \geq G_L$, $G_L$ corresponds to the granularity value of the measuring device having the largest granularity value.

11. The processing device of claim 9, wherein the message includes the new granularity value $G_{new}$.

* * * * *